United States Patent
Yoshifuji et al.

(10) Patent No.: US 11,647,161 B1
(45) Date of Patent: May 9, 2023

(54) RESOLVING VISIBILITY DISCREPENCIES OF VIRTUAL OBJECTS IN EXTENDED REALITY DEVICES

(71) Applicant: INTERNATIONAL BUSINESS MACHINES CORPORATION, Armonk, NY (US)

(72) Inventors: Nobuyuki Yoshifuji, Kawasaki (JP); Kenya Ishimoto, Machida (JP); Koichi Omae, Koto-ku (JP)

(73) Assignee: INIERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/662,886

(22) Filed: May 11, 2022

(51) Int. Cl.
*H04N 7/15* (2006.01)
*G06T 19/00* (2011.01)

(52) U.S. Cl.
CPC .......... *H04N 7/157* (2013.01); *G06T 19/006* (2013.01); *G06T 2219/024* (2013.01)

(58) Field of Classification Search
CPC .. H04N 7/157; G06T 19/006; G06T 2219/024
See application file for complete search history.

(56) References Cited

U.S. PATENT DOCUMENTS

| | | | |
|---|---|---|---|
| 9,122,321 B2 | 9/2015 | Perez | |
| 10,799,792 B2 | 10/2020 | Rios | |
| 11,190,411 B1 * | 11/2021 | Comazzetto | H04L 41/40 |
| 2007/0011622 A1 * | 1/2007 | Chae | G06F 16/1734 715/764 |
| 2013/0342570 A1 * | 12/2013 | Kinnebrew | G09G 3/003 345/633 |

(Continued)

FOREIGN PATENT DOCUMENTS

| | | |
|---|---|---|
| CN | 105393158 A | 3/2016 |
| GB | 2536790 A | 9/2016 |

(Continued)

OTHER PUBLICATIONS

Billinghurst, et al., "Collaborative Mixed Reality," IN Proceedings of the First International Symposium on Mixed Reality (ISMR '99), pp. 261-284, Bedin, Springer Verlag.

(Continued)

*Primary Examiner* — Haoshian Shih
(74) *Attorney, Agent, or Firm* — Robert R. Aragona (57) ABSTRACT

An embodiment for resolving visibility discrepancies of virtual objects in extended reality devices is provided. The embodiment may include receiving one or more virtual objects and a setting for each virtual object from one or more users during an extended reality meeting. The embodiment may also include identifying an owner of each virtual object. The embodiment may further include identifying a referenced virtual object. The embodiment may also include in response to determining the referenced virtual object is only visible to the owner, displaying a warning notification to the owner prior to sharing. The embodiment may further include querying the owner as to whether to share the referenced virtual object with the one or more users other than the owner. The embodiment may also include in response to determining the owner wants to share the referenced virtual object, sharing the referenced virtual object.

17 Claims, 7 Drawing Sheets

(56) References Cited

U.S. PATENT DOCUMENTS

| | | | | |
|---|---|---|---|---|
| 2013/0342571 A1* | 12/2013 | Kinnebrew | ............. | G06F 3/147 |
| | | | | 345/633 |
| 2014/0368537 A1* | 12/2014 | Salter | ................... | G06T 19/006 |
| | | | | 345/633 |
| 2018/0240276 A1* | 8/2018 | He | ........................ | G06T 15/503 |
| 2021/0069589 A1 | 3/2021 | Fajt | | |

FOREIGN PATENT DOCUMENTS

| | | |
|---|---|---|
| JP | 2021033916 A | 3/2021 |
| WO | 2014204905 A1 | 12/2014 |

OTHER PUBLICATIONS

Lukosch, et al., "Collaboration in Augmented Reality," Computer Supported Cooperative Work (CSCW) (2015) 24, Springerlink, pp. 515-525, <https://link.springer.com/article/10.1007/s10606-015-9239-0 >.

Mell et al., "The NIST Definition of Cloud Computing", Recommendations of the National Institute of Standards and Technology, NIST Special Publication 800-145, Sep. 2011, 7 pages.

* cited by examiner

RESOLVING VISIBILITY DISCREPENCIES OF VIRTUAL OBJECTS IN EXTENDED REALITY DEVICES

BACKGROUND

The present invention relates generally to the field of computing, and more particularly to a system for resolving visibility discrepancies of virtual objects in extended reality devices.

Extended reality (XR) devices and software have become popular in recent memory for both consumers and businesses. These devices and software may include an XR headset or XR glasses, as well as XR gaming and socializing applications, respectively. Such XR devices and software may allow a user to simply gaze through the XR headset or glasses at a real-world surrounding environment or interact with several other users and display a completely virtual (e.g., fictional) or enhanced version of that real-world surrounding environment. As technology continues to improve and influence the daily interactions individuals have with each other, the demand for XR devices and software is expected to increase in the coming years.

SUMMARY

According to one embodiment, a method, computer system, and computer program product for resolving visibility discrepancies of virtual objects in extended reality devices is provided. The embodiment may include receiving one or more virtual objects and a setting for each virtual object from one or more users during an extended reality meeting. The embodiment may also include identifying an owner of each virtual object based on the setting for each virtual object. The embodiment may further include identifying a referenced virtual object based on one or more captured actions of the one or more users. The embodiment may also include in response to determining the referenced virtual object is only visible to the owner, displaying a warning notification to the owner prior to sharing the referenced virtual object. The embodiment may further include querying the owner as to whether to share the referenced virtual object with the one or more users other than the owner. The embodiment may also include in response to determining the owner wants to share the referenced virtual object, sharing the referenced virtual object with the one or more users other than the owner.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

Embodiments of the present invention relate to the field of computing, and more particularly to a system for resolving visibility discrepancies of virtual objects in extended reality (XR) devices. The following described exemplary embodiments provide a system, method, and program product to, among other things, identify a referenced virtual object based on one or more captured actions of one or more users and, accordingly, determine whether an owner of the referenced virtual object wants to share the referenced virtual object with the one or more users who are unable to see the referenced virtual object. Therefore, the present embodiment has the capacity to improve XR technology by dynamically detecting and resolving visibility discrepancies between participants during an XR meeting.

As previously described, XR devices and software have become popular in recent memory for both consumers and businesses. These devices and software may include an XR headset or XR glasses, as well as XR gaming and socializing applications, respectively. Such XR devices and software may allow a user to simply gaze through the XR headset or glasses at a real-world surrounding environment or interact with several other users and display a completely virtual (e.g., fictional) or enhanced version of that real-world surrounding environment. As technology continues to improve and influence the daily interactions individuals have with each other, the demand for XR devices and software is expected to increase in the coming years. During XR collaborative meetings, the virtual objects may not be seen by all the participants. For example, one user may see a virtual automobile, but another user may not see the virtual automobile. This problem is typically addressed by making the virtual objects visible to all participants. However, making these virtual objects visible to all participants exposes sensitive information about a business and/or one or more participants.

It may therefore be imperative to have a system in place to detect and resolve visibility discrepancies between participants during an XR meeting. Thus, embodiments of the present invention may provide advantages including, but not limited to, dynamically detecting and resolving visibility discrepancies between participants during an XR meeting, notifying an owner of a referenced virtual object about the status of the referenced virtual object prior to sharing the referenced virtual object, and allowing the owner of the referenced virtual object to select which participants are able to view the referenced virtual object. The present invention does not require that all advantages need to be incorporated into every embodiment of the invention.

According to at least one embodiment, during an XR meeting, one or more virtual objects and a setting for each virtual object may be received from one or more users in order to identify an owner of each virtual object based on the setting for each virtual object. Upon identifying the owner, a referenced virtual object may be identified based on one or more captured actions of the one or more users. According to at least one embodiment, in response to determining the referenced virtual object is only visible to the owner, a warning notification may be displayed to the owner prior to sharing the referenced virtual object so that the owner may be queried as to whether to share the referenced virtual object with the one or more users other than the owner. In response to determining the owner wants to share the referenced virtual object, the referenced virtual object may be shared with the one or more users other than the owner.

According to at least one other embodiment, in response to determining the referenced virtual object is not only visible to the owner, a warning notification may be displayed to the owner prior to sharing the referenced virtual object with one or more unauthorized users so that the owner may be queried as to whether to share the referenced virtual object with the one or more unauthorized users. In response to determining the owner wants to share the referenced virtual object with the one or more unauthorized users, the referenced virtual object may be shared with the one or more unauthorized users.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to identify a referenced virtual object based on one or more captured actions of one or more users and, accordingly, determine whether an owner of the referenced virtual object wants to share the referenced virtual object with the one or more users who are unable to see the referenced virtual object.

Figure 1:
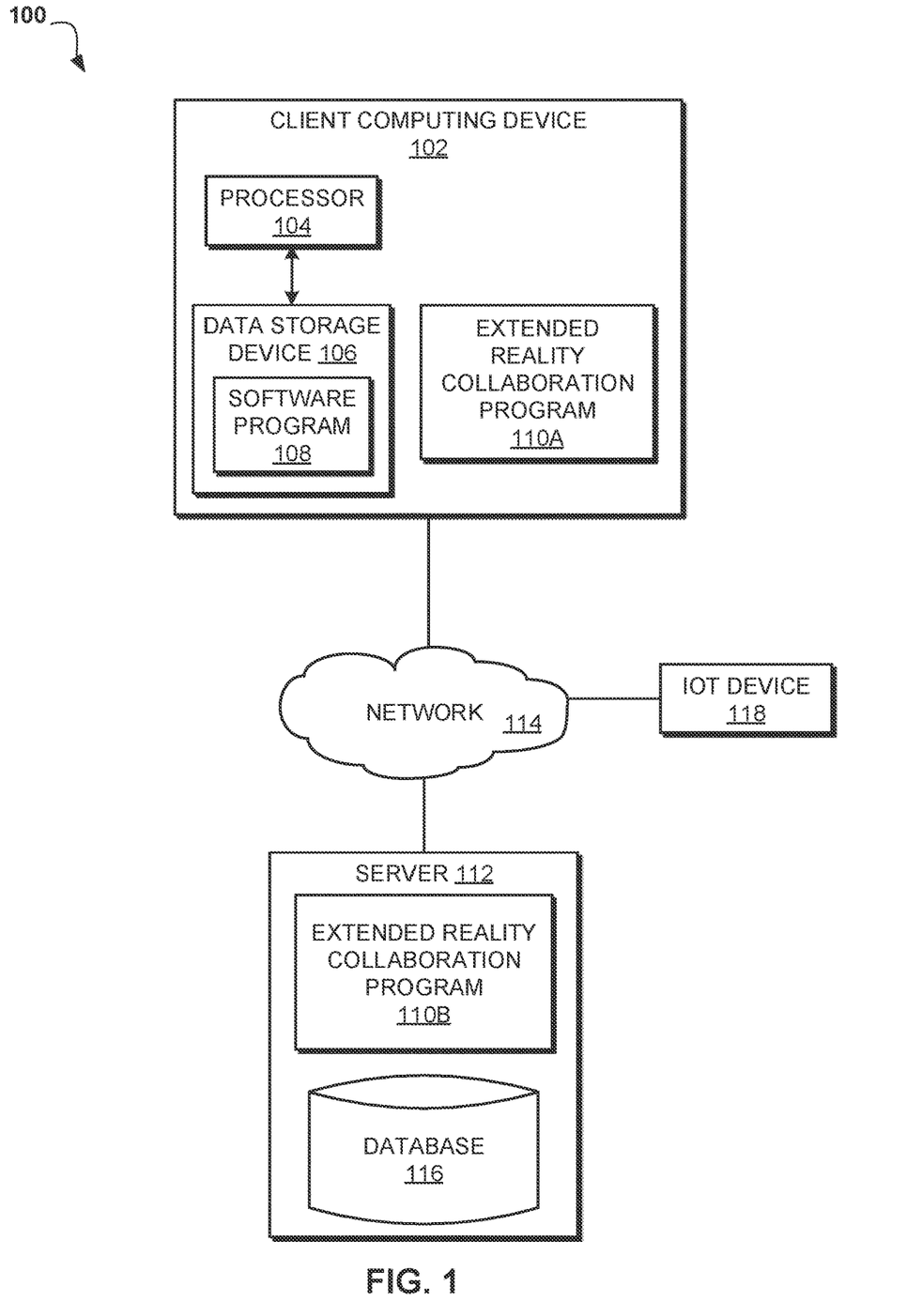
FIG. 1 illustrates an exemplary networked computer environment according to at least one embodiment.

Referring to FIG. 1, an exemplary networked computer environment 100 is depicted, according to at least one embodiment. The networked computer environment 100 may include client computing device 102, a server 112, and Internet of Things (IoT) Device 118 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

Client computing device 102 may include a processor 104 and a data storage device 106 that is enabled to host and run a software program 108 and an XR collaboration program 110A and communicate with the server 112 and IoT Device 118 via the communication network 114, in accordance with one embodiment of the invention. Client computing device 102 may be, for example, a mobile device, a telephone, a personal digital assistant, a netbook, a laptop computer, a tablet computer, a desktop computer, or any type of computing device capable of running a program and accessing a network. As will be discussed with reference to FIG. 4, the client computing device 102 may include internal components 402a and external components 404a, respectively.

The server computer 112 may be a laptop computer, netbook computer, personal computer (PC), a desktop computer, or any programmable electronic device or any network of programmable electronic devices capable of hosting and running an XR collaboration program 110B and a database 116 and communicating with the client computing device 102 and IoT Device 118 via the communication network 114, in accordance with embodiments of the invention. As will be discussed with reference to FIG. 4, the server computer 112 may include internal components 402b and external components 404b, respectively. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

IoT Device 118 may be eye tracking sensors, a motion sensor, an XR device, such as XR smart glasses and/or an XR headset, a microphone embedded in or external to the client computing device 102, and/or any other IoT Device 118 known in the art for tracking body movement and/or capturing audio output that is capable of connecting to the communication network 114, and transmitting and receiving data with the client computing device 102 and the server 112.

According to the present embodiment, the XR collaboration program 110A, 110B may be a program capable of receiving one or more virtual objects and a setting for each virtual object from one or more users during an XR meeting, identifying a referenced virtual object based on one or more captured actions of the one or more users, determining whether an owner of the referenced virtual object wants to share the referenced virtual object with the one or more users who are unable to see the referenced virtual object, dynamically detecting and resolving visibility discrepancies between participants (i.e., users) during the XR meeting, notifying the owner of the referenced virtual object about the status of the referenced virtual object prior to sharing the referenced virtual object, and allowing the owner of the referenced virtual object to select which participants are able to view the referenced virtual object. The XR collaboration method is explained in further detail below with respect to FIGS. 2A and 2B.

Figure 2A:
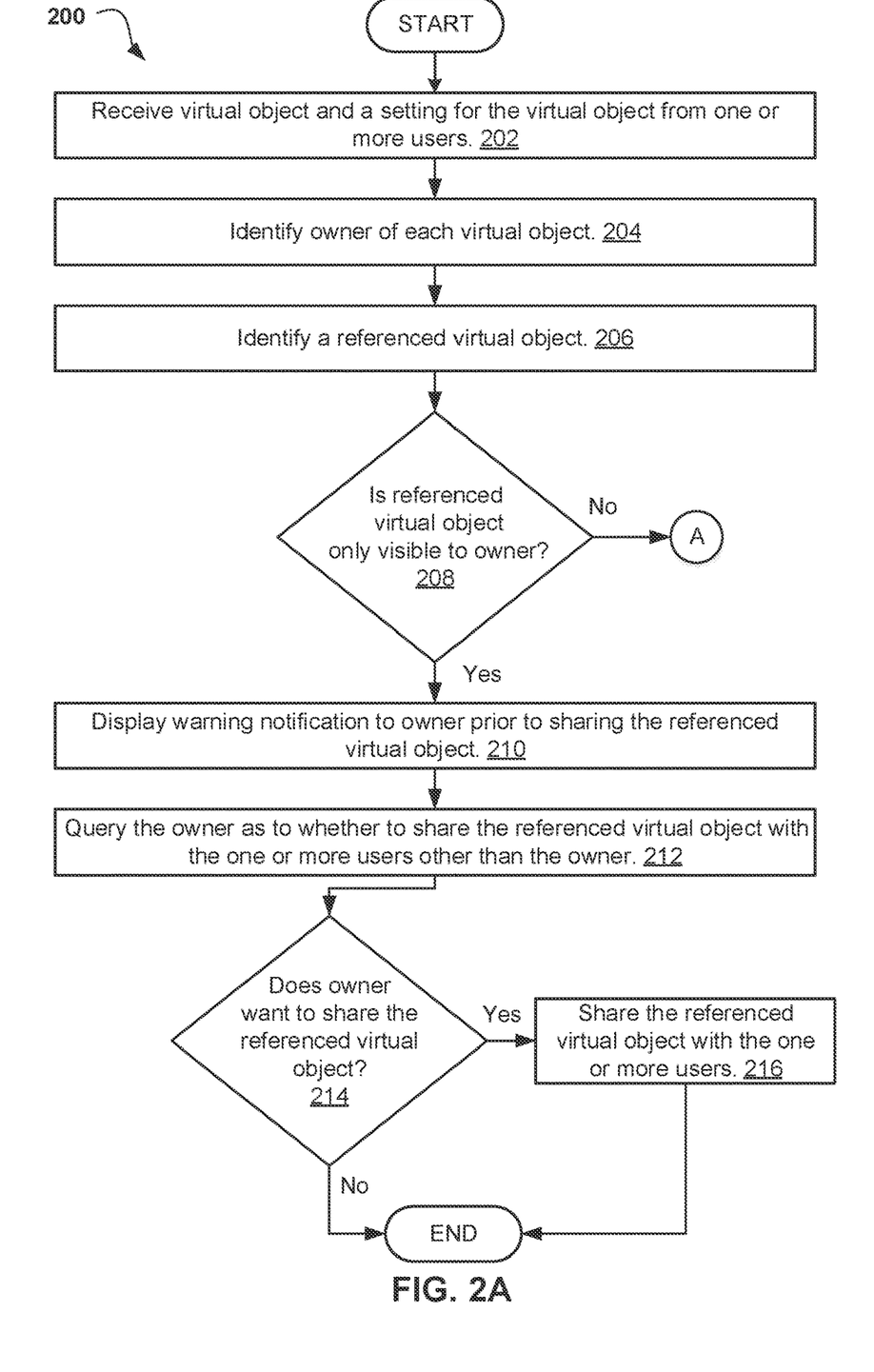
FIGS. 2A and 2B illustrates an operational flowchart for resolving visibility discrepancies of virtual objects in extended reality (XR) devices in a visibility discrepancy resolution process according to at least one embodiment.
Figure 2B:
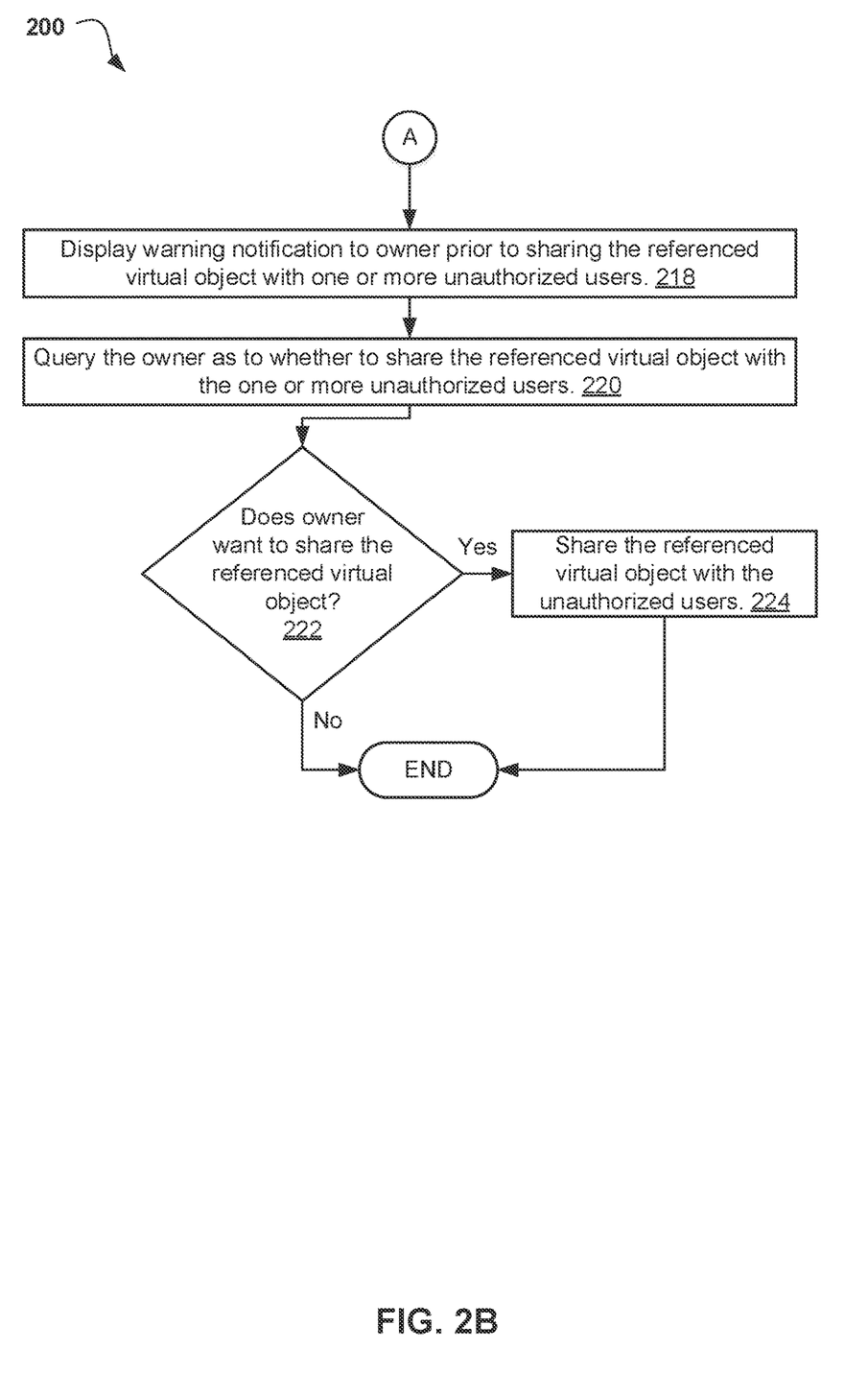

Referring now to FIGS. 2A and 2B, an operational flowchart for resolving visibility discrepancies of virtual objects in XR devices in a visibility discrepancy resolution process 200 is depicted according to at least one embodiment. At 202, the XR collaboration program 110A, 110B receives the one or more virtual objects and the setting for each virtual object from the one or more users during the XR meeting. Utilizing the software program 108, the one or more users may arbitrarily create and place the one or more virtual objects in a 3D XR space. For example, "User 1" may create and place a virtual automobile atop their computer keyboard, and "User 2" may create and place a virtual animal atop their TV stand or table. It may be appreciated that the example described above is not intended to be limiting, and that in embodiments of the present invention the virtual object may represent different real-world objects and may be placed in a variety of different locations.

Once the one or more virtual objects are created, the user who created each virtual object may associate the setting with the virtual object. According to at least one embodiment, the setting may be a private virtual object. According to at least one other embodiment, the setting may be an exclusively shared virtual object. According to at least one further embodiment, the setting may be a shared virtual object. The settings for each virtual object are described in further detail below with respect to step 204.

Then, at 204, the XR collaboration program 110A, 110B identifies the owner of each virtual object. The owner is identified based on the setting for each virtual object described above with respect to step 202. As used herein, the "owner" of each virtual object is the user who created the virtual object and associated the setting with the virtual object. Continuing the example in step 202 above, "User 1" may be the owner of the virtual automobile, and "User 2" may be the owner of the virtual animal. As described above with respect to step 202, the owner may associate the setting with the virtual object.

In the embodiment where the setting is a private virtual object, the virtual object may initially only be visible to the owner. For example, where "User 1" made the setting for the virtual automobile private, "User 1" may be the only user in the XR meeting who can see the virtual automobile. In the embodiment where the setting is an exclusively shared virtual object, the virtual object may initially be visible to the owner as well as at least one other user specified by the owner. For example, where "User 1" made the setting for the virtual automobile exclusively shared, "User 1" may designate "User 3", "User 6", and "User 10" as "authorized users" who are able to see the virtual object along with the owner (i.e., "User 1"). In the embodiment where the setting is a shared virtual object, the virtual object may be visible to all users who are participating in the XR meeting. For example, where "User 2" made the setting for the virtual animal shared, each of the one or more users participating in the XR meeting would be able to see the virtual object.

Next, at 206, the XR collaboration program 110A, 110B identifies the referenced virtual object. The referenced virtual object is identified based on one or more captured actions of the one or more users. The referenced virtual object may be any virtual object that is referred to by the one or more users via the one or more captured actions during the XR meeting, described in further detail below.

According to at least one embodiment, the captured action may be a voice of the one or more users. The voice of the one or more users may be captured by the IoT Device 118 including, but not limited to, the XR device, such as the XR smart glasses or the XR headset, and/or the microphone. In particular, the voice of the one or more users may refer to a particular virtual object in the surrounding environment of the one or more users. The XR collaboration program 110A, 110B may utilize a voice recognition module, illustrated and described in further detail below with respect to FIG. 3, to convert the voice of the one or more users into text. Then, a speech analyzer module, also illustrated and described in further detail below with respect to FIG. 3, executes natural language processing (NLP) on the text to identify objects referred to in the text. For example, "User 1" may say, "That car in the middle of the room is an electric car." In this example, the referenced virtual object may be the car in the middle of the room. In another example, "User 2" may say, "The animal on my TV stand is part of an endangered species." In this example, the referenced virtual object may be the animal on the TV stand. Additionally, when the one or more virtual objects are shared or exclusively shared, a user other than the owner may refer to the virtual object. For example, "User 3" may say, "In what year was the helicopter on the table in the middle of the room made." In this example, the referenced virtual object may be the helicopter."

According to at least one other embodiment, the voice of the one or more users alone may not be sufficient to identify the referenced virtual object. For example, "User 1" may say, "That car over there is an electric car." However, there may be multiple virtual cars in the surrounding environment of "User 1." In this embodiment, the captured action may be a line of sight of the one or more users. The line of sight may be captured by the IoT Device 118 including, but not limited to, the XR device, such as the XR smart glasses or the XR headset, and/or the eye tracking sensors, illustrated and described in further detail below with respect to FIG. 3. Continuing the example above, "User 1" may be looking directly at the electric car in the middle of the room atop a table. In this example, the referenced virtual object may be the electric car in the middle of the room atop the table, and not two other electric cars on either side of the room. Additionally, when the one or more virtual objects are shared or exclusively shared, a user other than the owner may refer to the virtual object. For example, "User 3" may say, "In what year was the helicopter on the table in the middle of the room made." However, there may be multiple virtual helicopters in the surrounding environment in which "User 3" is looking. In this example, the line of sight of "User 3" may indicate that "User 3" is looking directly at the helicopter atop a TV stand, and the referenced virtual object may be the helicopter atop the TV stand.

According to at least one further embodiment, the voice of the one or more users and the line of sight may not be sufficient to identify the referenced virtual object. For example, "User 2" may say, "The animal over there can be seen at many locations around the country." However, there may be multiple virtual animals in the surrounding environment of "User 2", and these virtual animals may be within a few inches of each other in the surrounding environment. In this embodiment, the captured action may be a hand and/or finger movement of the one or more users. The hand and/or finger movement may be captured by the IoT Device 118 including, but not limited to, the XR device, such as the XR smart glasses or the XR headset, and/or the motion sensor. Continuing the example above, "User 2" may be looking directly at three virtual animals in the middle of the room atop a table. "User 2", and/or another user physically located adjacent to "User 2" when the one or more virtual objects are shared or exclusively shared, may be pointing directly at the virtual animal all the way to the right. In this example, the referenced virtual object may be the animal all the way to the right, and not two other animals to the left of the referenced animal. It may be appreciated that the examples described above are not intended to be limiting, and that in embodiments of the present invention the referenced virtual object may represent different real-world objects and may be placed in a variety of different locations.

Then, at 208, the XR collaboration program 110A, 110B determines whether the referenced virtual object is only visible to the owner. The determination is made based on the one or more captured actions and the setting associated with the referenced virtual object.

As described above with respect to step 204, the setting for each virtual object, may be private, exclusively shared, or shared. This setting is applied to the referenced virtual object, which is selected among the one or more virtual objects by the one or more users. Where the referenced virtual object is a private virtual object, the referenced virtual object may initially only be visible to the owner. For example, where "User 1" created the referenced virtual automobile and made the setting for the referenced virtual automobile, "User 1" may be the only user in the XR meeting who can see the referenced virtual automobile. Where the referenced virtual object is an exclusively shared virtual object, the referenced virtual object may initially be visible to the owner as well as at least one other user specified by the owner. For example, where "User 1" created the referenced virtual automobile and made the setting for the referenced virtual automobile, "User 1" may designate "User 3", "User 6", and "User 10" as "authorized users" who are able to see the referenced virtual object along with the owner (i.e., "User 1"). Where the referenced virtual object is a shared virtual object, the referenced virtual object may be visible to all users who are participating in the XR meeting. For example, where "User 2" created the referenced virtual animal and made the setting for the referenced virtual animal, each of the one or more users participating in the XR meeting would be able to see the referenced virtual animal.

The one or more captured actions may bolster the determination as to whether the referenced virtual object is only visible to the owner. For example, due to a technological glitch, a private virtual object may be displayed to users other than the owner. This other user may see the virtual object and refer to the virtual object by voice, line of sight, and/or hand or finger movements.

In response to determining the referenced virtual object is only visible to the owner (step 208, "Yes" branch), the visibility discrepancy resolution process 200 proceeds to step 210 to display the warning notification to the owner prior to sharing the referenced virtual object. In response to determining the referenced virtual object is not only visible to the owner (step 208, "No" branch), the visibility discrepancy resolution process 200 proceeds to step 218 to display the warning notification to the owner prior to sharing the referenced virtual object with the one or more unauthorized users.

Next, at 210, the XR collaboration program 110A, 110B displays the warning notification to the owner prior to sharing the referenced virtual object. According to at least one embodiment, the warning notification may be a visual cue displayed to the owner. Examples of the visual cue include, but are not limited to, a change in an appearance of the referenced virtual object, (e.g., a change in color, shape, transparency, light illumination, and/or contour enhancement), and/or a pop-up message (e.g., A pop-up with text stating, "User 3 cannot see the referenced virtual object"). According to at least one other embodiment, the warning notification may be an audio cue spoken to the owner. For example, the audio output may be, "User 3 cannot see the referenced virtual object."

According to at least one other embodiment, the one or more users other than the owner may be informed about the existence and location of the referenced virtual object without actually seeing the referenced virtual object by displaying to these one or more other users a placeholder for the referenced virtual object. Examples of the placeholder include, but are not limited to, a cloud bubble and/or a translucent object with a blurred outline at the location of the referenced virtual object. In this embodiment, prior to sharing the referenced virtual object, the placeholder may be displayed to the one or more users other than the owner.

Then, at 212, the XR collaboration program 110A, 110B queries the owner as to whether to share the referenced virtual object with the one or more users other than the owner. Upon displaying the warning notification, the XR collaboration program 110A, 110B may prompt the owner with an audio and/or visual message asking the owner whether to share the referenced virtual object with the one or more users other than the owner. For example, a pop-up message may ask the owner, "Do you want to share the referenced virtual object with your fellow attendees?"

Next, at 214, the XR collaboration program 110A, 110B determines whether the owner wants to share the referenced virtual object with the one or more users other than the owner. The determination may be made based on the response of the owner to the query presented in step 212. Continuing the example described above with respect to step 212, the response of the owner to the pop-up message may be "Yes" or "No." According to at least one embodiment, when the owner wants to share the referenced virtual object, the owner may set a time limit on sharing the referenced virtual object. For example, the owner may decide to share the referenced virtual object for five minutes.

In response to determining the owner wants to share the referenced virtual object (step 214, "Yes" branch), the visibility discrepancy resolution process 200 proceeds to step 216 to share the referenced virtual object with the one or more users other than the owner. In response to determining the owner does not want to share the referenced virtual object (step 214, "No" branch), the visibility discrepancy resolution process 200 ends and the referenced virtual object is not shared.

Then, at 216, the XR collaboration program 110A, 110B shares the referenced virtual object with the one or more users other than the owner. The referenced virtual object may be shared by creating a digital copy of the private referenced virtual object and sharing the digital copy via the XR device of the one or more other users. For example, where the private referenced virtual object is a virtual automobile, a digital copy of the referenced virtual automobile may be displayed to the one or more other users via the XR device. According to at least one embodiment, where the owner decides to share the referenced virtual object for five minutes, the referenced virtual object may only be displayed to the one or more other users for five minutes.

Next, at 218, the XR collaboration program 110A, 110B displays the warning notification to the owner prior to sharing the referenced virtual object with the one or more unauthorized users. As used herein, an "unauthorized user" may be any user who does not currently have permission to view the referenced virtual object. For example, where "User 1" made the setting for the virtual automobile exclusively shared, "User 1" may designate "User 3", "User 6", and "User 10" as "authorized users", and any user not designated would be an unauthorized user. According to at least one embodiment, as described above with respect to step 210, the warning notification may be the visual cue displayed to the owner. Examples of the visual cue include, but are not limited to, a change in an appearance of the referenced virtual object, (e.g., a change in color, shape, transparency, light illumination, and/or contour enhancement), and/or a pop-up message (e.g., A pop-up with text stating, "User 4 cannot see the referenced virtual object"). According to at least one other embodiment, the warning notification may be an audio cue spoken to the owner. For example, the audio output may be, "User 4 cannot see the referenced virtual object."

According to at least one other embodiment, the one or more unauthorized users may be informed about the existence and location of the referenced virtual object without actually seeing the referenced virtual object by displaying to these one or more unauthorized users a placeholder for the referenced virtual object. Examples of the placeholder include, but are not limited to, a cloud bubble and/or a translucent object with a blurred outline at the location of the referenced virtual object. In this embodiment, prior to sharing the referenced virtual object with the one or more unauthorized users, the placeholder may be displayed to the one or more unauthorized users.

Then, at 220, the XR collaboration program 110A, 110B queries the owner as to whether to share the referenced virtual object with the one or more unauthorized users. Upon displaying the warning notification, the XR collaboration program 110A, 110B may prompt the owner with an audio and/or visual message asking the owner whether to share the referenced virtual object with the one or more unauthorized users. For example, a pop-up message may ask the owner, "Do you want to share the referenced virtual object with any users you have not previously designated?"

Next, at 222, the XR collaboration program 110A, 110B determines whether the owner wants to share the referenced virtual object with the one or more unauthorized users. The determination may be made based on the response of the owner to the query presented in step 220. Continuing the example described above with respect to step 220, the response of the owner to the pop-up message may be "Yes" or "No." According to at least one embodiment, when the owner wants to share the referenced virtual object, the owner may set a time limit on sharing the referenced virtual object. For example, the owner may decide to share the referenced virtual object for five minutes.

In response to determining the owner wants to share the referenced virtual object with the one or more unauthorized users (step 222, "Yes" branch), the visibility discrepancy resolution process 200 proceeds to step 224 to share the referenced virtual object with the one or more unauthorized users. In response to determining the owner does not want to share the referenced virtual object with the one or more unauthorized users (step 222, "No" branch), the visibility discrepancy resolution process 200 ends and the referenced virtual object is not shared with the one or more unauthorized users.

Then, at 224, the XR collaboration program 110A, 110B shares the referenced virtual object with the one or more unauthorized users. The referenced virtual object may be shared by changing the setting of the referenced virtual object from exclusively shared to shared and mapping the referenced virtual object to the XR device of the one or more unauthorized users. It may be appreciated that in embodiments of the present invention, upon changing the setting for a referenced virtual object to shared, the one or more unauthorized users become one or more authorized users for that particular referenced virtual object. For example, where the exclusively shared referenced virtual object is a virtual automobile, the referenced virtual automobile may be mapped to the XR device of the previously unauthorized users, who are now authorized users. According to at least one embodiment, where the owner decides to share the referenced virtual object for five minutes, the referenced virtual object may only be displayed to the now authorized users for five minutes.

Figure 3:
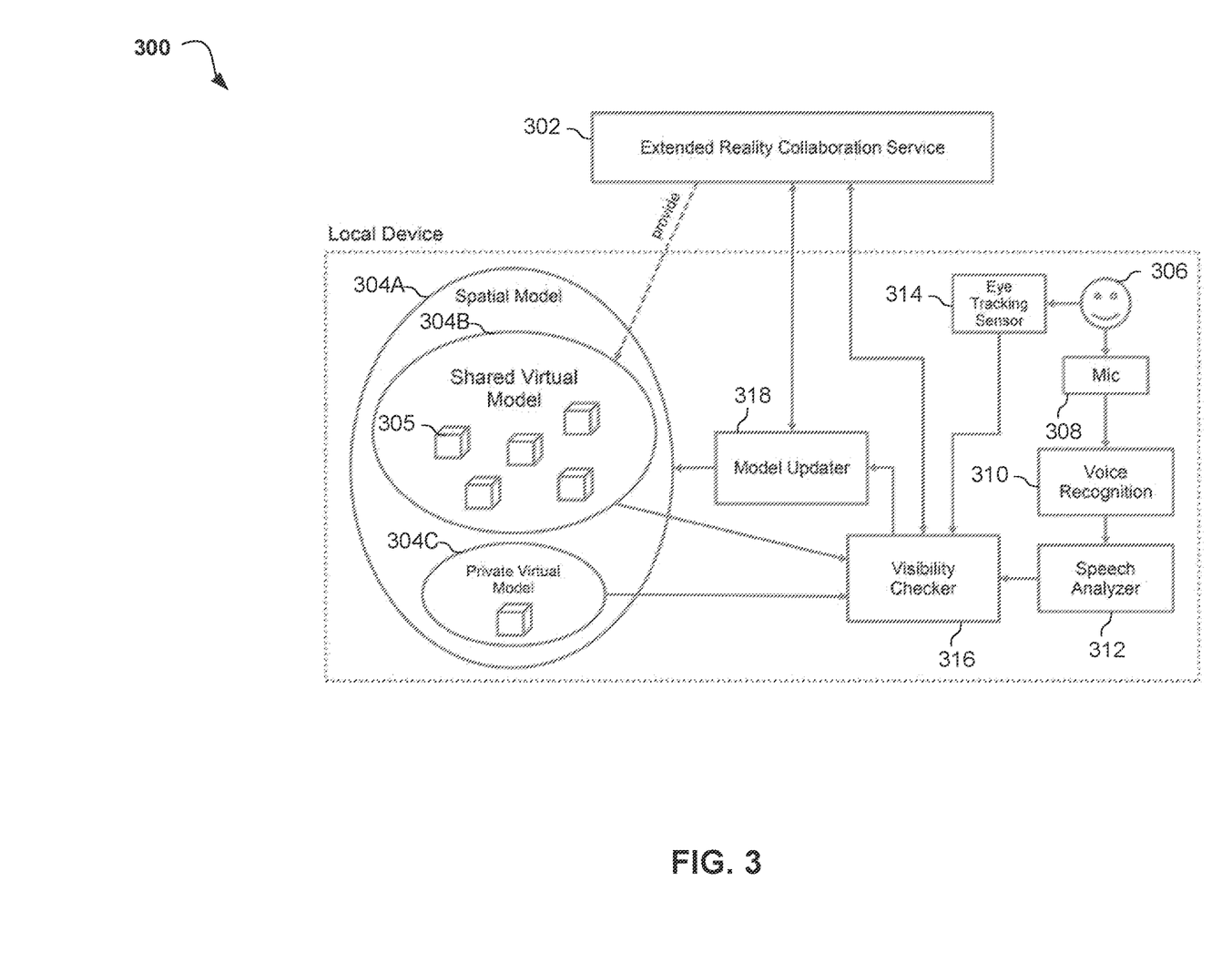
FIG. 3 is a diagram depicting an interaction between solution components of the process in FIG. 2 according to at least one embodiment.

Referring now to FIG. 3, a diagram 300 depicting an operational example of an interaction between solution components of the process in FIG. 2 is shown according to at least one embodiment. In the diagram 300, an extended reality collaboration service 302 may provide a spatial model 304A of a 3D XR space. The spatial model 304A may include a shared virtual model 304B and/or a private virtual model 304C. In the shared virtual model 304B, the setting of the one or more virtual objects 305 may be either shared or exclusively shared. In the private virtual model 304C, the setting of the one or more virtual objects 305 may be private and currently only visible to the owner 306. According to at least one embodiment, the owner 306 may speak into a microphone 308 and a voice recognition module 310 may convert the speech into text. The text may then be fed to a speech analyzer module 312 which may execute NLP on the text to detect a word or words that refer to an object. For example, the speech analyzer module 312 may analyze the text, "That car in the middle of the room is an electric car", and determine the car is a referenced virtual object. According to at least one other embodiment, when the referenced virtual object cannot accurately be identified by the speech alone, the eye tracking sensors 314 may track the line of sight of the owner 306 to help identify the referenced virtual object. In the present embodiment, once the referenced virtual object is identified, a visibility checker module 316 may be utilized to determine whether the referenced virtual object is only visible to the owner 306 or is visible to the owner 306 and at least one other user (i.e., an authorized user). In response to determining the owner 306 wants to share the referenced virtual object that is currently only visible to the owner 306, a model updater module 318 may update the status of the referenced virtual object from private to shared. In response to determining the owner 306 wants to share the referenced virtual object that is currently visible to the owner as well as the at least one other user (i.e., the authorized user), the model updater module 318 may update the status of the referenced virtual object from exclusively shared to shared.

It may be appreciated that FIGS. 2A, 2B, and 3 provide only an illustration of one implementation and do not imply any limitations with regard to how different embodiments may be implemented. Many modifications to the depicted environments may be made based on design and implementation requirements.

Figure 4:
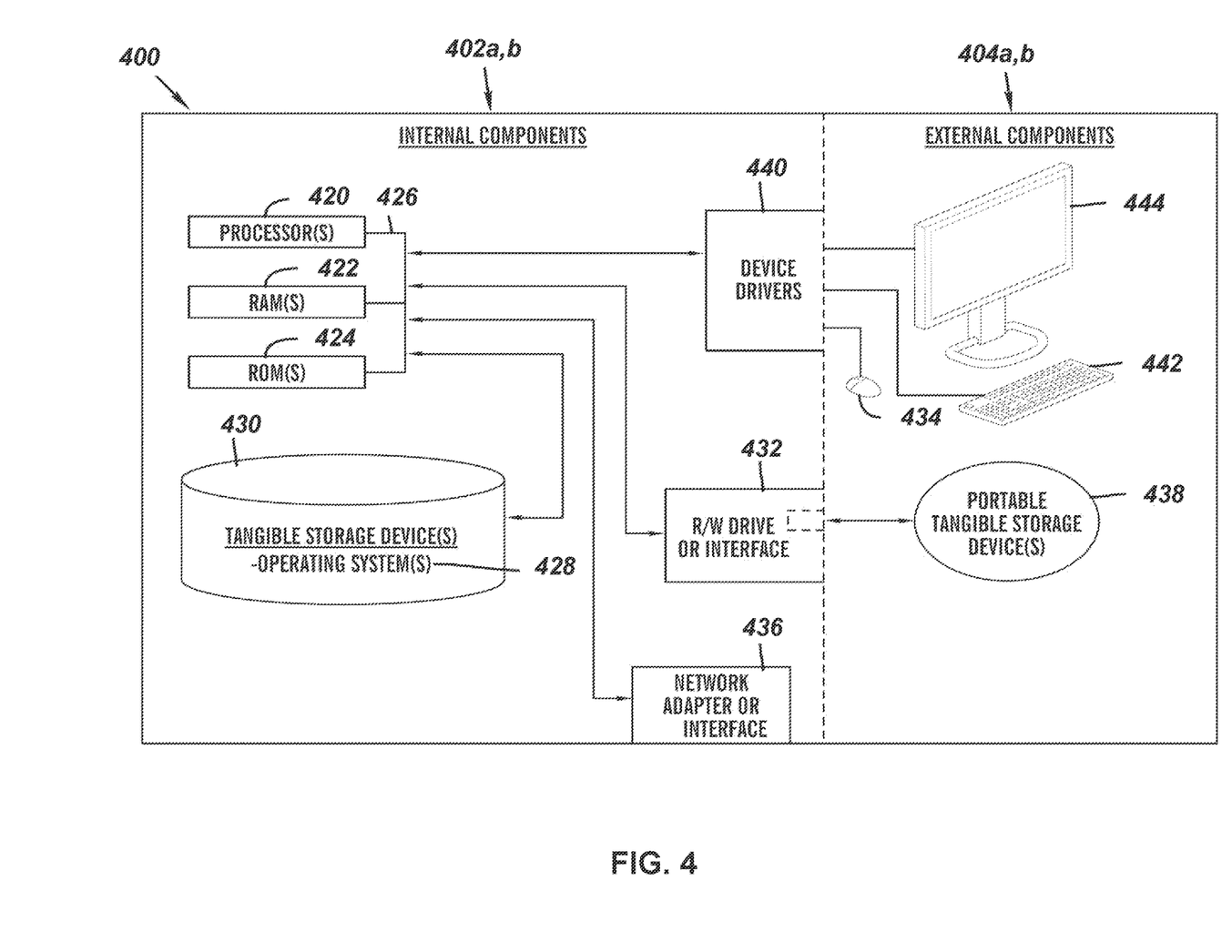
FIG. 4 is a functional block diagram of internal and external components of computers and servers depicted in FIG. 1 according to at least one embodiment.

FIG. 4 is a block diagram 400 of internal and external components of the client computing device 102 and the server 112 depicted in FIG. 1 in accordance with an embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

The data processing system 402, 404 is representative of any electronic device capable of executing machine-readable program instructions. The data processing system 402, 404 may be representative of a smart phone, a computer system, PDA, or other electronic devices. Examples of computing systems, environments, and/or configurations that may represented by the data processing system 402, 404 include, but are not limited to, personal computer systems, server computer systems, thin clients, thick clients, handheld or laptop devices, multiprocessor systems, microprocessor-based systems, network PCs, minicomputer systems, and distributed cloud computing environments that include any of the above systems or devices.

The client computing device 102 and the server 112 may include respective sets of internal components 402 a,b and external components 404 a,b illustrated in FIG. 4. Each of the sets of internal components 402 include one or more processors 420, one or more computer-readable RAMs 422, and one or more computer-readable ROMs 424 on one or more buses 426, and one or more operating systems 428 and one or more computer-readable tangible storage devices 430. The one or more operating systems 428, the software program 108 and the XR collaboration program 110A in the client computing device 102 and the XR collaboration program 110B in the server 112 are stored on one or more of the respective computer-readable tangible storage devices 430 for execution by one or more of the respective processors 420 via one or more of the respective RAMs 422 (which typically include cache memory). In the embodiment illustrated in FIG. 4, each of the computer-readable tangible storage devices 430 is a magnetic disk storage device of an internal hard drive. Alternatively, each of the computer-readable tangible storage devices 430 is a semiconductor storage device such as ROM 424, EPROM, flash memory or any other computer-readable tangible storage device that can store a computer program and digital information.

Each set of internal components 402 a,b also includes a R/W drive or interface 432 to read from and write to one or more portable computer-readable tangible storage devices 438 such as a CD-ROM, DVD, memory stick, magnetic tape, magnetic disk, optical disk or semiconductor storage device. A software program, such as the XR collaboration program 110A, 110B, can be stored on one or more of the respective portable computer-readable tangible storage devices 438, read via the respective R/W drive or interface 432, and loaded into the respective hard drive 430.

Each set of internal components 402 a,b also includes network adapters or interfaces 436 such as a TCP/IP adapter cards, wireless Wi-Fi interface cards, or 3G or 4G wireless interface cards or other wired or wireless communication links. The software program 108 and the XR collaboration program 110A in the client computing device 102 and the XR collaboration program 110B in the server 112 can be downloaded to the client computing device 102 and the server 112 from an external computer via a network (for example, the Internet, a local area network or other, wide area network) and respective network adapters or interfaces 436. From the network adapters or interfaces 436, the software program 108 and the XR collaboration program 110A in the client computing device 102 and the XR collaboration program 110B in the server 112 are loaded into the respective hard drive 430. The network may comprise copper wires, optical fibers, wireless transmission, routers, firewalls, switches, gateway computers and/or edge servers.

Each of the sets of external components 404 a,b can include a computer display monitor 444, a keyboard 442, and a computer mouse 434. External components 404 a,b can also include touch screens, virtual keyboards, touch pads, pointing devices, and other human interface devices. Each of the sets of internal components 402 a,b also includes device drivers 440 to interface to computer display monitor 444, keyboard 442, and computer mouse 434. The device drivers 440, R/W drive or interface 432, and network adapter or interface 436 comprise hardware and software (stored in storage device 430 and/or ROM 424).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
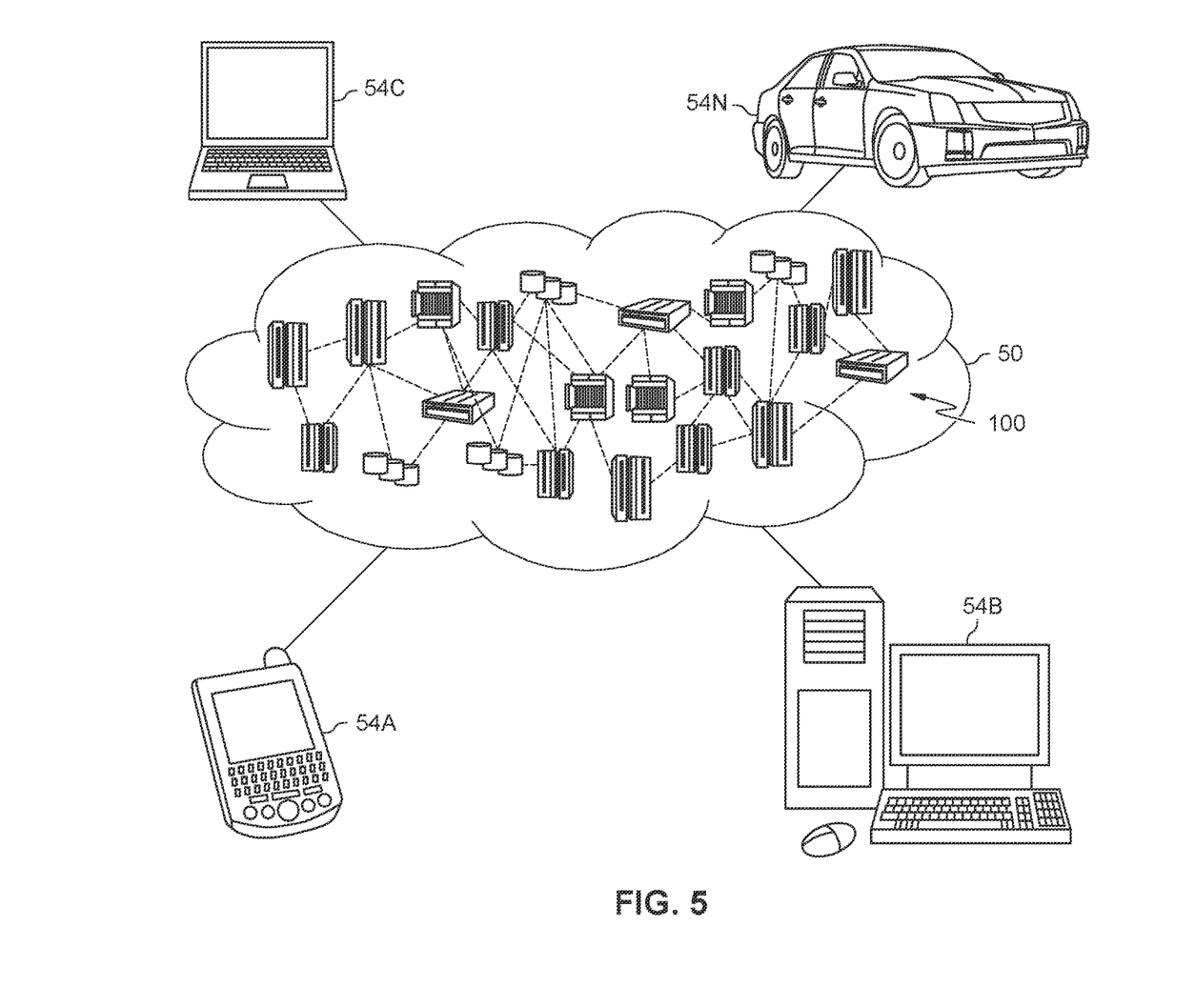
FIG. 5 depicts a cloud computing environment according to an embodiment of the present invention.

Referring now to FIG. 5, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 5 are intended to be illustrative only and that computing nodes 100 and cloud computing environment 50 can communicate with any type of computerized device over any type of network and/or network addressable connection (e.g., using a web browser).

Figure 6:
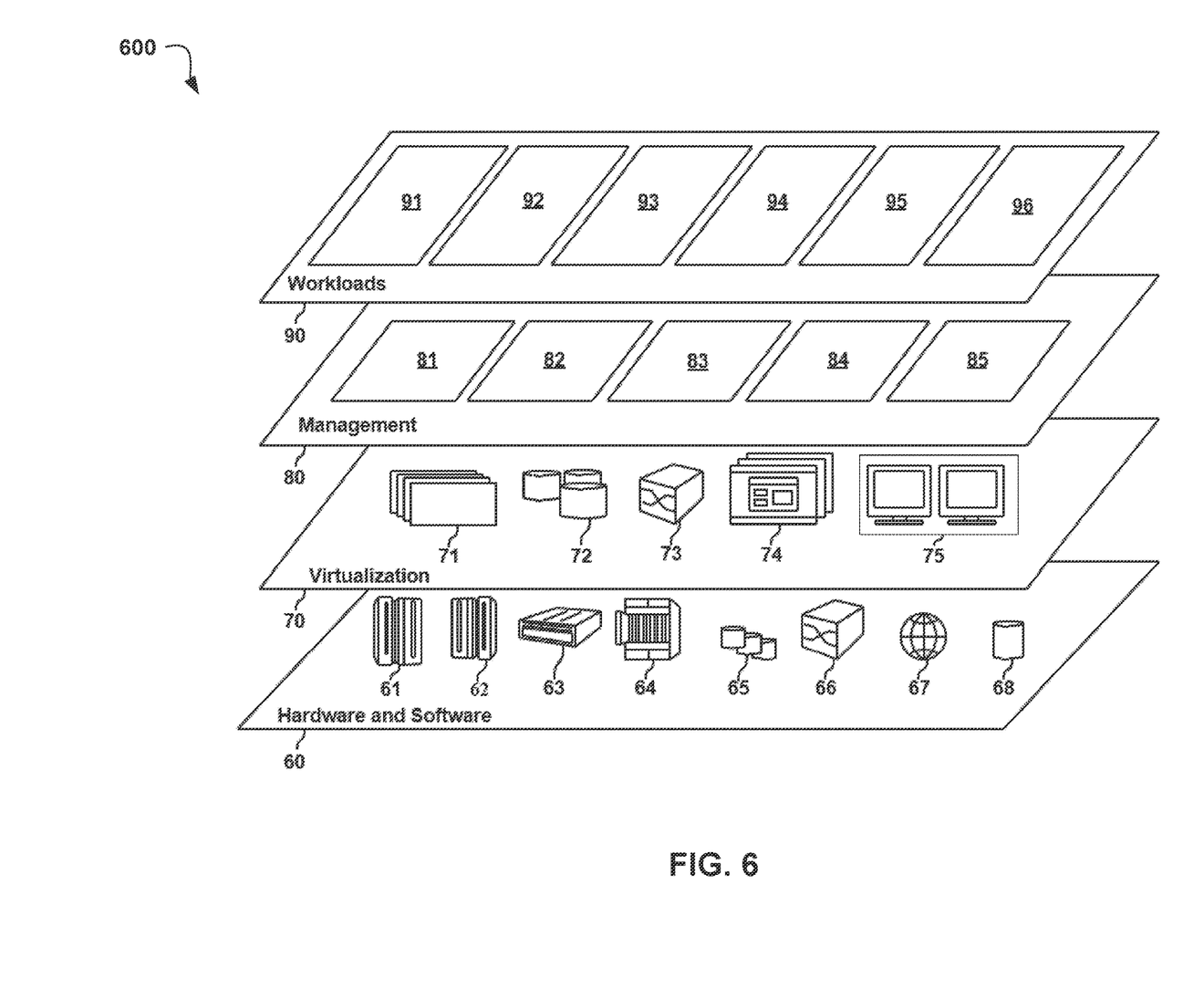
FIG. 6 depicts abstraction model layers according to an embodiment of the present invention.

Referring now to FIG. 6, a set of functional abstraction layers 600 provided by cloud computing environment 50 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and resolving visibility discrepancies of virtual objects in XR devices 96. Resolving visibility discrepancies of virtual objects in XR devices 96 may relate to identifying a referenced virtual object based on one or more captured actions of one or more users in order to determine whether an owner of the referenced virtual object wants to share the referenced virtual object with the one or more users who are unable to see the referenced virtual object.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-based method of resolving visibility discrepancies of virtual objects in extended reality devices, the method comprising:

receiving one or more virtual objects and a setting for each virtual object from one or more users during an extended reality meeting;

identifying an owner of each virtual object based on the setting for each virtual object;

identifying a referenced virtual object based on one or more captured actions of the one or more users;

determining whether the referenced virtual object is only visible to the owner based on the one or more captured actions and the setting associated with the referenced virtual object; and in response to determining the referenced virtual object is only visible to the owner:

displaying a warning notification to the owner prior to sharing the referenced virtual object, wherein the warning notification is a change in an appearance of the referenced virtual object including a different transparency of the referenced virtual object, and wherein the change in the appearance indicates that the referenced virtual object is not visible to any user other than the owner; and querying the owner as to whether to share the referenced virtual object with the one or more users other than the owner.

2. The computer-based method of claim 1, further comprising:

determining whether the owner wants to share the referenced virtual object with the one or more users other than the owner; and in response to determining the owner wants to share the referenced virtual object, sharing the referenced virtual object with the one or more users other than the owner.

3. The computer-based method of claim 1, further comprising:

in response to determining the referenced virtual object is not only visible to the owner:

displaying the warning notification to the owner prior to sharing the referenced virtual object with one or more unauthorized users; and querying the owner as to whether to share the referenced virtual object with the one or more unauthorized users.

4. The computer-based method of claim 3, further comprising:

determining whether the owner wants to share the referenced virtual object with the one or more unauthorized users; and in response to determining the owner wants to share the referenced virtual object with the one or more unauthorized users, sharing the referenced virtual object with the one or more unauthorized users.

5. The computer-based method of claim 1, wherein the setting is selected from a group consisting of a private virtual object, an exclusively shared virtual object, and a shared virtual object.

6. The computer-based method of claim 1, wherein the captured action is selected from a group consisting of a hand movement of the one or more users, a line of sight of the one or more users, and a voice of the one or more users.

7. A computer system, the computer system comprising:

one or more processors, one or more computer-readable memories, one or more computer-readable tangible storage medium, and program instructions stored on at least one of the one or more computer-readable tangible storage medium for execution by at least one of the one or more processors via at least one of the one or more computer-readable memories, wherein the computer system is capable of performing a method comprising:

receiving one or more virtual objects and a setting for each virtual object from one or more users during an extended reality meeting;

identifying an owner of each virtual object based on the setting for each virtual object;

identifying a referenced virtual object based on one or more captured actions of the one or more users;

determining whether the referenced virtual object is only visible to the owner based on the one or more captured actions and the setting associated with the referenced virtual object; and in response to determining the referenced virtual object is only visible to the owner:

displaying a warning notification to the owner prior to sharing the referenced virtual object, wherein the warning notification is a change in an appearance of the referenced virtual object including a different transparency of the referenced virtual object, and wherein the change in the appearance indicates that the referenced virtual object is not visible to any user other than the owner; and querying the owner as to whether to share the referenced virtual object with the one or more users other than the owner.

8. The computer system of claim 7, further comprising:

determining whether the owner wants to share the referenced virtual object with the one or more users other than the owner; and in response to determining the owner wants to share the referenced virtual object, sharing the referenced virtual object with the one or more users other than the owner.

9. The computer system of claim 7, further comprising:

in response to determining the referenced virtual object is not only visible to the owner:

displaying the warning notification to the owner prior to sharing the referenced virtual object with one or more unauthorized users; and querying the owner as to whether to share the referenced virtual object with the one or more unauthorized users.

10. The computer system of claim 9, further comprising:

determining whether the owner wants to share the referenced virtual object with the one or more unauthorized users; and in response to determining the owner wants to share the referenced virtual object with the one or more unauthorized users, sharing the referenced virtual object with the one or more unauthorized users.

11. The computer system of claim 7, wherein the setting is selected from a group consisting of a private virtual object, an exclusively shared virtual object, and a shared virtual object.

12. The computer system of claim 7, wherein the captured action is selected from a group consisting of a hand movement of the one or more users, a line of sight of the one or more users, and a voice of the one or more users.

13. A computer program product, the computer program product comprising:

one or more computer-readable tangible storage medium and program instructions stored on at least one of the one or more computer-readable tangible storage medium, the program instructions executable by a processor capable of performing a method, the method comprising:

receiving one or more virtual objects and a setting for each virtual object from one or more users during an extended reality meeting;

identifying an owner of each virtual object based on the setting for each virtual object;

identifying a referenced virtual object based on one or more captured actions of the one or more users;

determining whether the referenced virtual object is only visible to the owner based on the one or more captured actions and the setting associated with the referenced virtual object; and in response to determining the referenced virtual object is only visible to the owner:

displaying a warning notification to the owner prior to sharing the referenced virtual object, wherein the warning notification is a change in an appearance of the referenced virtual object including a different transparency of the referenced virtual object, and wherein the change in the appearance indicates that the referenced virtual object is not visible to any user other than the owner; and querying the owner as to whether to share the referenced virtual object with the one or more users other than the owner.

14. The computer program product of claim 13, further comprising:

determining whether the owner wants to share the referenced virtual object with the one or more users other than the owner; and in response to determining the owner wants to share the referenced virtual object, sharing the referenced virtual object with the one or more users other than the owner.

15. The computer program product of claim 13, further comprising:

in response to determining the referenced virtual object is not only visible to the owner:

displaying the warning notification to the owner prior to sharing the referenced virtual object with one or more unauthorized users; and querying the owner as to whether to share the referenced virtual object with the one or more unauthorized users.

16. The computer program product of claim 15, further comprising:

determining whether the owner wants to share the referenced virtual object with the one or more unauthorized users; and in response to determining the owner wants to share the referenced virtual object with the one or more unauthorized users, sharing the referenced virtual object with the one or more unauthorized users.

17. The computer program product of claim 13, wherein the setting is selected from a group consisting of a private virtual object, an exclusively shared virtual object, and a shared virtual object.

\* \* \* \* \*